United States Patent
Wang

(10) Patent No.: US 8,070,193 B2
(45) Date of Patent: Dec. 6, 2011

(54) FOLDABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 771 days.

(21) Appl. No.: 12/198,880

(22) Filed: Aug. 26, 2008

(65) Prior Publication Data

US 2010/0007155 A1 Jan. 14, 2010

(30) Foreign Application Priority Data

Jul. 11, 2008 (CN) .......................... 2008 1 0302709

(51) Int. Cl.
*E05C 19/10* (2006.01)

(52) U.S. Cl. ..................................... 292/99; 361/679.27

(58) Field of Classification Search ............... 292/99, 292/101, 102, 106, 116, 120, 303, 156, 295, 292/340, 341, 80, 81, 8, 10, 87, DIG. 11, 292/91; 361/679.09, 379.11, 679.12
See application file for complete search history.

(56) References Cited

U.S. PATENT DOCUMENTS

| | | | | |
|---|---|---|---|---|
| 417,619 A * | 12/1889 | Woodard | ........................ | 292/87 |
| 3,694,015 A * | 9/1972 | Gley | ............................... | 292/80 |
| 4,069,997 A * | 1/1978 | Weiss | ............................. | 248/553 |
| RE29,925 E * | 3/1979 | McGillivray | ................. | 292/121 |
| 4,676,370 A * | 6/1987 | Rudick | ........................... | 206/1.5 |
| 5,893,573 A * | 4/1999 | Arbeiter | ........................ | 280/238 |
| 6,435,572 B1 * | 8/2002 | Ticu et al. | ..................... | 292/175 |

* cited by examiner

*Primary Examiner* — Gary Estremsky
(74) *Attorney, Agent, or Firm* — Altis Law Group, Inc.

(57) ABSTRACT

An exemplary foldable electronic device includes a first cover, a second cover coupled to the first cover and a latch mechanism. The latch mechanism includes a hooking portion disposed on the first cover and a latching portion formed on the second cover. The hooking portion has a hook, the latching portion has a latching slot, an unlatching slot, and a sliding slot connecting the latching slot and the unlatching slot. The hook is deformable to capable of latching the latching slot or unlatching from the latching portion when sliding to the unlatching slot along the sliding slot.

12 Claims, 5 Drawing Sheets

FOLDABLE ELECTRONIC DEVICE

BACKGROUND OF THE INVENTION

1. Field of the Invention

The present invention generally relates to foldable electronic devices and, particularly, to a foldable electronic device having a top cover and a main body.

2. Discussion of the Related Art

Referring to FIGS. 4 and 5, a typical housing 80 of a foldable electronic device is shown. The housing 80 includes a main body 81, a top cover 82, a sliding member 83, a hook 84, and a spring 85. The main body 81 defines a latching groove 811 adjacent to a side of the main body 81. The top cover 82 defines a rectangular mounting groove 821 in a side of the top cover 82 and forms a resisting member 823 that is adjacent to the mounting groove 821. The sliding member 83 is disposed in the mounting groove 821 and is capable of sliding, left or right, along the mounting groove 821. The hook 84 is configured to be latched in the latching groove 811. The hook 84 includes an end that is fixed to the sliding member 83 so that the hook 84 is movable together with the sliding member 83. One end of the spring 85 abuts the resisting member 823 and the other end of the spring 85 abuts the hook 84 so that the hook 84 and the sliding member 83 are normally forced to remain on the left side of the mounting groove 821.

To open the top cover 82, a user has to slide the sliding member 83 towards the right side of the mounting groove 821. However, the sliding member 83 is generally designed to be inconspicuous, thereby having a small outer surface area and the outer surface of the sliding member 83 may line up with the surface of the edge (side) of the cover. Thus when sliding the sliding member 83 with a finger to open the top cover 82, the finger may slip. As a result, opening the top cover 82 maybe bothersome.

Therefore, a new foldable electronic device is desired in order to overcome the above-described shortcomings.

SUMMARY

An exemplary foldable electronic device includes a first cover, a second cover coupled to the first cover, and a latch mechanism. The latch mechanism includes a hooking portion disposed on the first cover and a latching portion formed on the second cover. The hooking portion has a hook, the latching portion has a latching slot, an unlatching slot, and a sliding slot connecting the latching slot and the unlatching slot. The hook is deformable to be capable of latching the latching slot or unlatching from the latching portion when sliding to the unlatching slot along the sliding slot.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present foldable electronic device. Moreover, in the drawings, like reference numerals designate corresponding parts throughout several views, and all the views are schematic.

DETAILED DESCRIPTION OF THE EXEMPLARY EMBODIMENTS

Reference will now be made to the drawings to describe an exemplary embodiment of the present foldable electronic device in detail.

The present foldable electronic devices, may be notebooks, cell phones, media players, and so on. In the exemplary embodiment, a notebook is taken as exemplary device to describe the foldable electronic device of the present invention.

Figure 1:
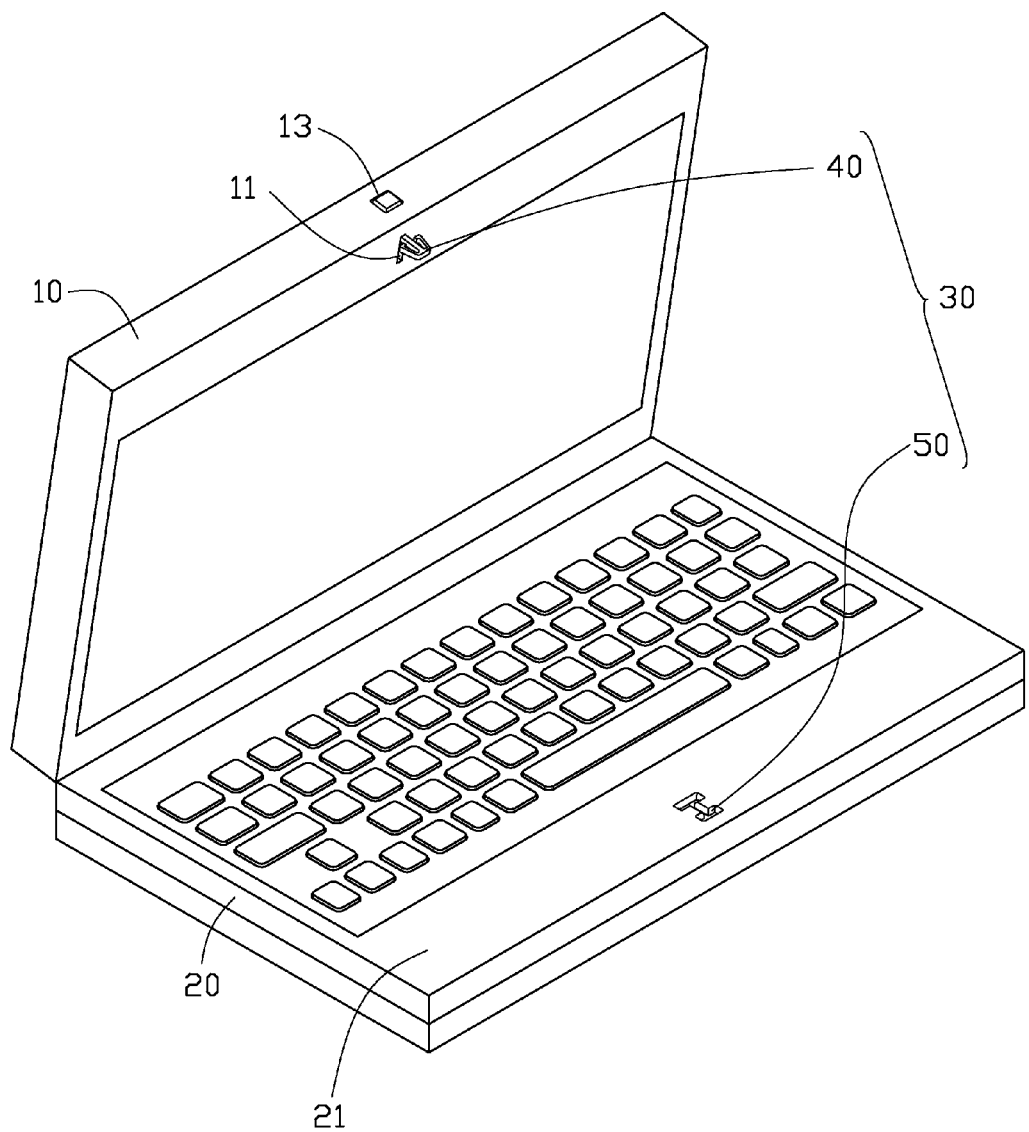
FIG. 1 is an assembled, isometric view of a foldable electronic device in accordance with an exemplary embodiment of the present invention.

Referring to FIG. 1, a notebook (not labeled) includes a top cover 10, a main body 20, and a latch mechanism 30 disposed between the top cover 10 and the main body 20. The top cover 10 is rotatably mounted to the main body 20.

The top cover 10 defines a first receptacle 11 and a second receptacle 13 at two adjoining sides of the top cover 10. The first and second receptacles 11, 13 communicate with each other.

Figure 2:
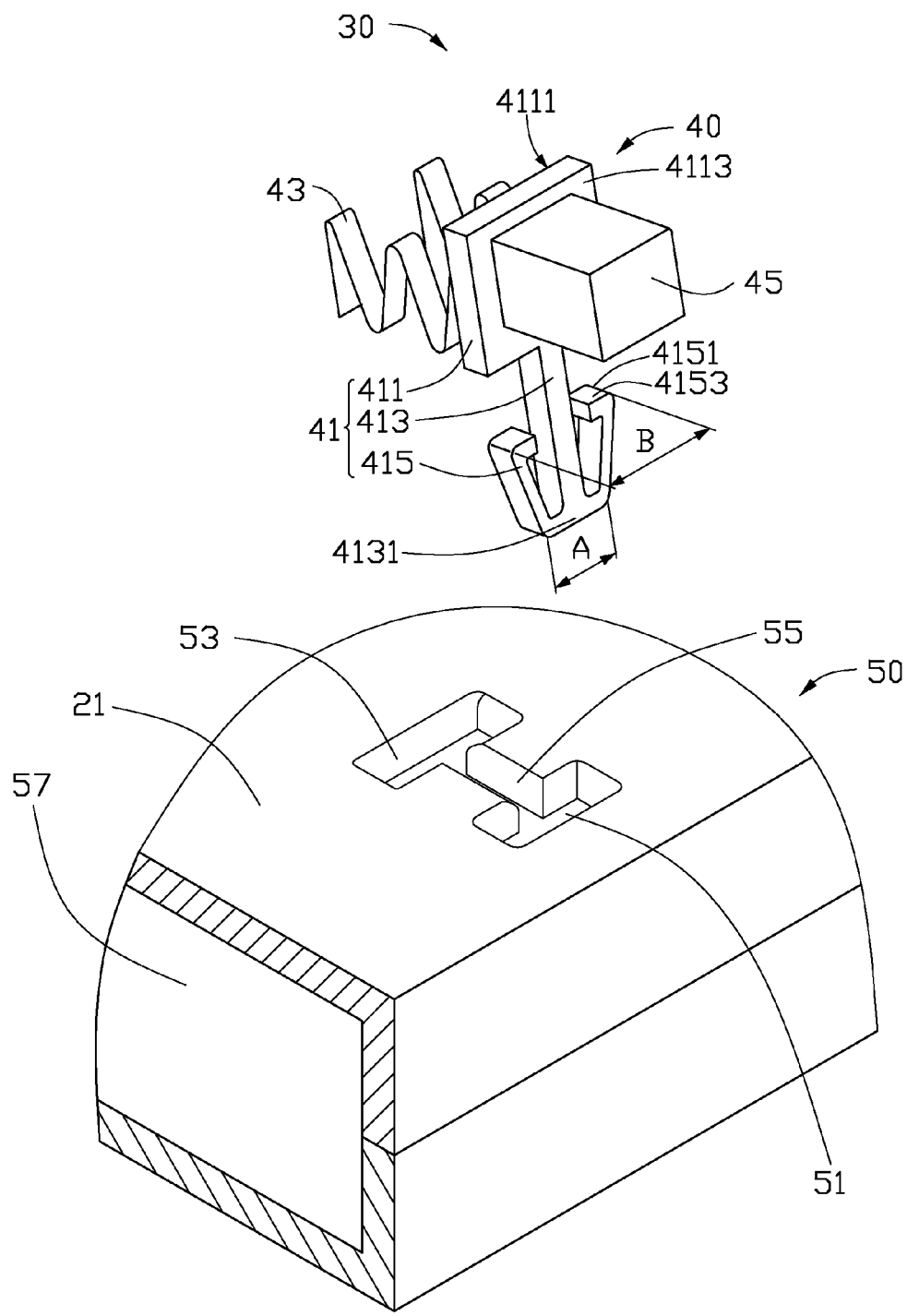
FIG. 2 is part of an exploded, isometric view of the foldable electronic device in FIG. 1.

The latch mechanism 30 includes a hooking portion 40 disposed in the top cover 10 and a latching portion 50 formed in the main body 20. Referring to FIG. 2, the hooking portion 40 includes a hook 41, an elastic member 43, and a button 45.

The hook 41 has a base 411, an inverted "T" shaped bracket 413, and two arms 415. The base 411 has a first surface 4111 and a second surface 4113 on another surface opposite to the first surface 4111. The bracket 413 extends from an edge of the base 411. The bracket 413 has a connecting portion 4131 at an end. The two arms 415 extend from opposite ends of the connection portion 4131 correspondingly. The arms 415 bend away from the connecting portion 4131 towards the base 411 and have two free ends 4151. The free ends 4151 form two protrusions 4153 extending toward the bracket 413. The arms 415 are elastic, thus bendable. The protrusions 4153 are configured for preventing the arms 415 from bending too much towards the bracket 413, thus the arms 415 are prevented from breaking.

An end of the elastic member 43 is fixed on the first surface 4111 of the base 411. The elastic member 43 may be a coiled spring, a leaf spring, a rubber rod etc. In this embodiment, the elastic member 43 is a leaf spring. In use, the other end of the elastic member 43 is fixed to the top cover 10. The button 45 is fixed on the second surface 4113 of the base 411, opposite to the first surface 4111.

The latching portion 50 is formed in a top surface 21 of the main body 20 and disposed corresponding to the hooking portion 40, it includes a latching slot 51, an unlatching slot 53, a sliding slot 55, and a receiving space 57. The latching slot 51, the unlatching slot 53, and the sliding slot 55 are rectangular in shape. The latching slot 51 and the unlatching slot 53 is parallel to each other and communicates with the sliding slot 55, thus cooperatively forming an "H" shaped slot. The receiving space 57 is formed below the top surface 21, and communicates with, the latching slot 51, the unlatching slot 53, and the sliding slot 55.

When the arms 415 are in a free (normal) state, the length of the latching slot 51 is longer than a length A of the connecting portion 4131, and longer than the distance between the two outer surfaces of the free ends 4151 of the arms 415 when the two ends 4151 are squeezed to touch the bracket 413 via the two protrusions 4153, and shorter than the distance B between the two outer surfaces at its largest measure of the free ends 4151 of the arms 415. The length of the unlatching slot 53 is longer than the distance B.

Figure 3:
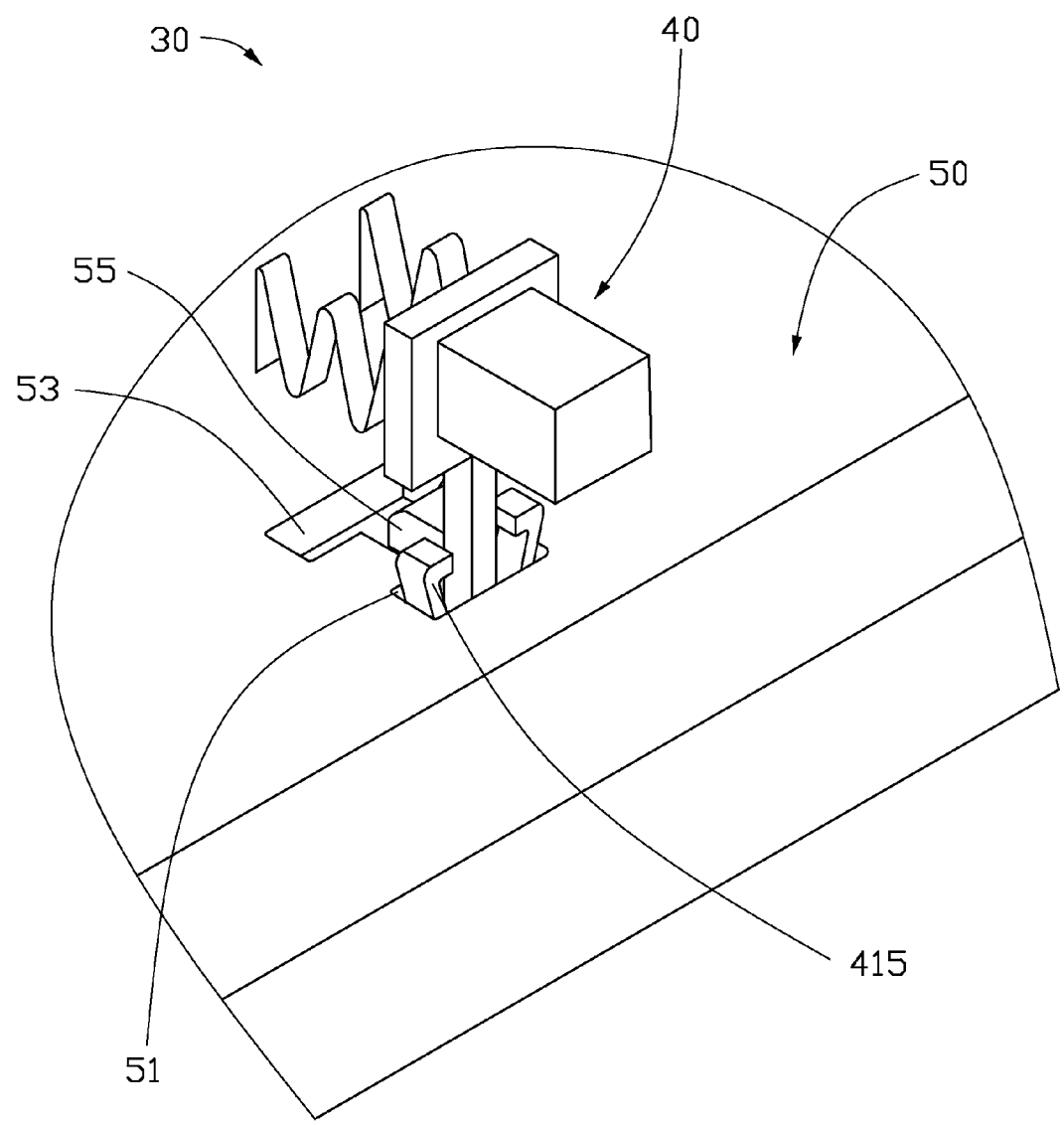
FIG. 3 is an isometric view showing a process of a top cover flipped over a main body of the foldable electronic device housing in FIG. 1.
Figure 4:
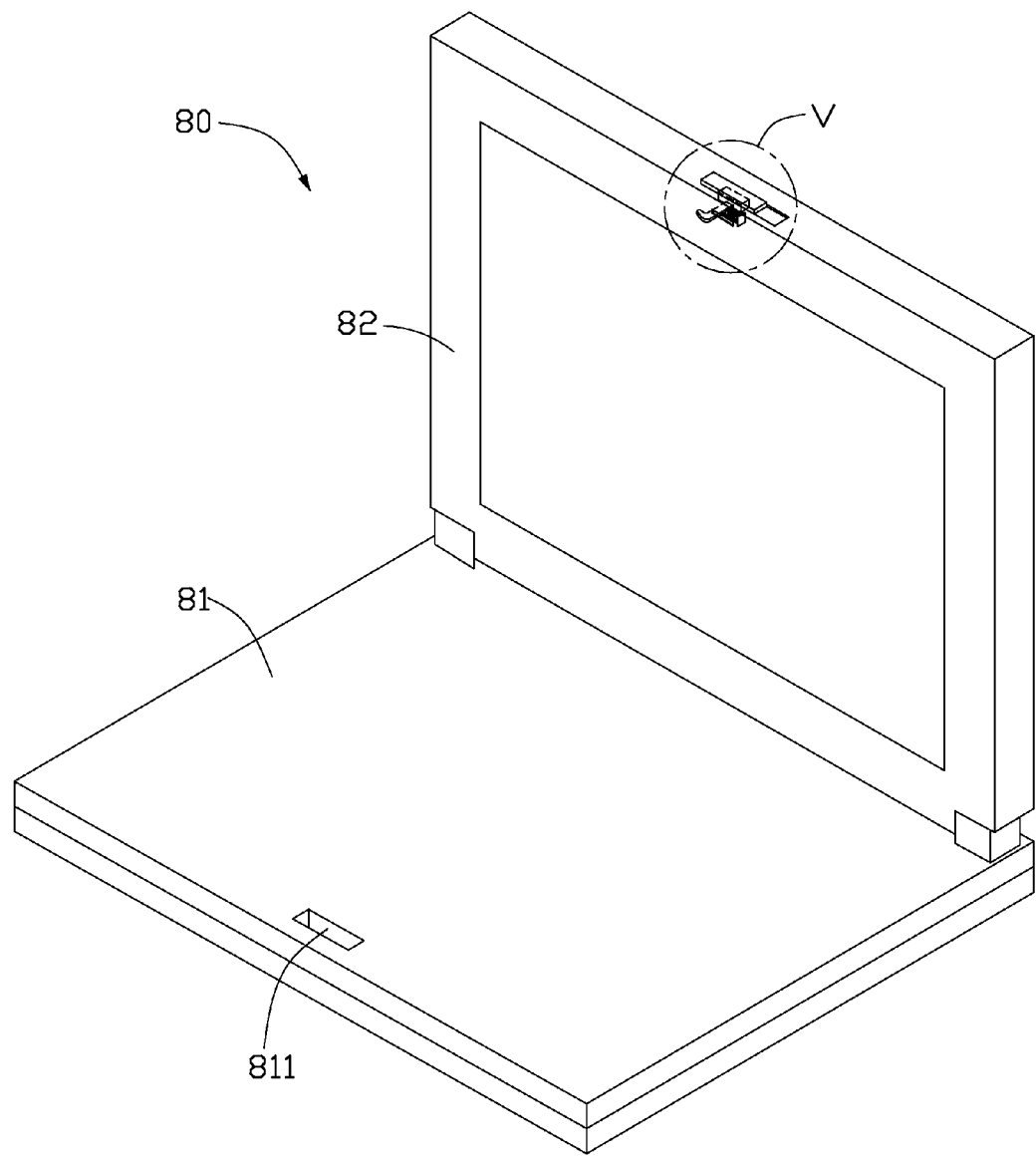
FIG. 4 is an isometric view of a related-art housing of a foldable electronic device.
Figure 5:
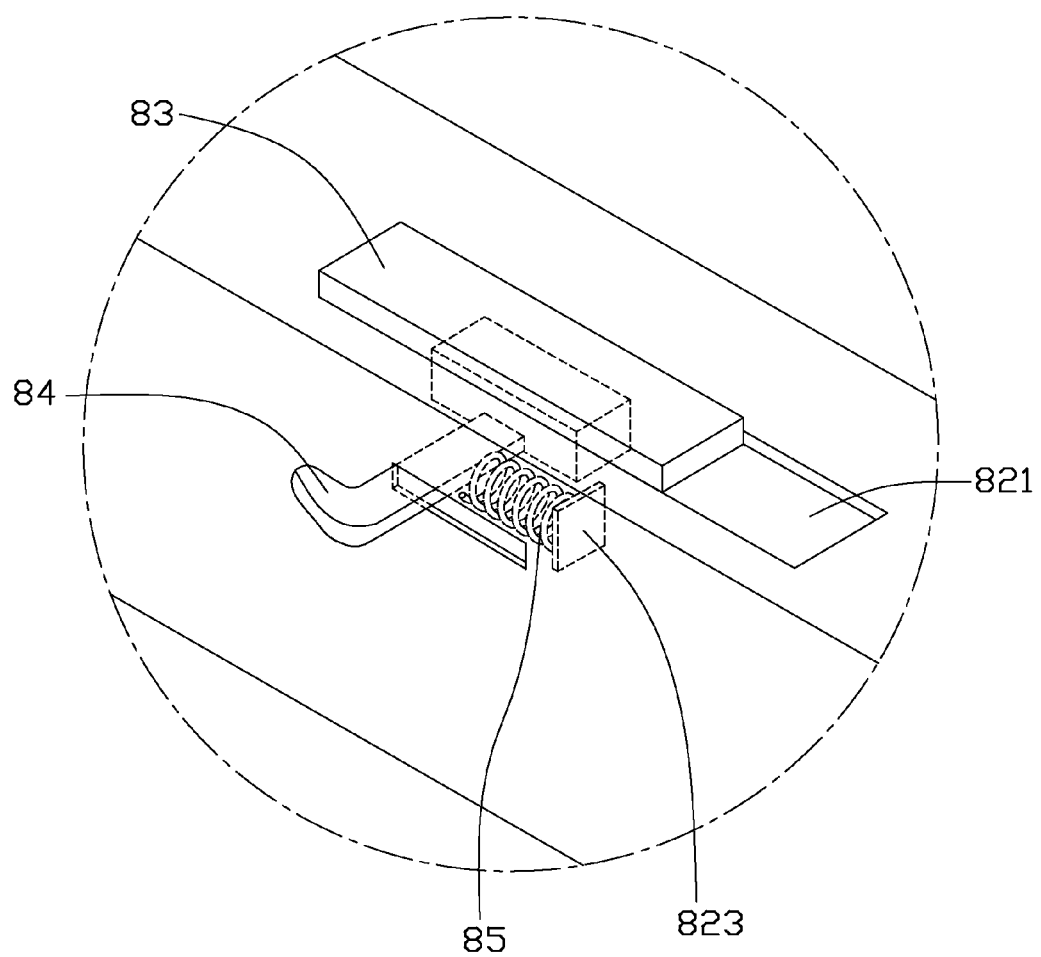
FIG. 5 is an enlarged view of the circled portion V in FIG. 4.

Referring also to FIG. 3, to fold the notebook, an external force is applied to the top cover 10 to push the top cover 10 towards the main body 20, the bracket 413 and the arms 415 of the hook 41 gradually move into the latching slot 51 and then the receiving space 57. In the process, the arms 415 deform towards each other. Once the free ends 4151 of the arms 415 pass the latching slot 51, the arms 415 return (spread out) to the normal state. As a result, the hook 41 becomes locked in the receiving space 57, thus, the top cover 10 is latched to the main body 20. This is because the length of the latching slot 51 is longer than the length A of the connecting portion 4131.

To open the top cover 10, another external force is applied on the button 45 to compress the elastic member 43, as a result, the hook 41 is driven to move in the receiving space 57 from a first position below the latching slot 51 to a second position below the unlatching slot 53. When the latch mechanism 30 is in the second position, the hook 41 can be unlatched from the latching portion 50 of the main body 20, thus unlatching the top cover 10 from the main body 20.

In the embodiment, the top cover 10 can be flipped opened by pushing the button 45. Therefore, slippage between a finger and the button seldom happens, therefore the top cover 10 can be easily flipped open.

In alternative embodiments, the hook 41, the elastic member 43, and the button 45 may be integrally formed or separately formed. The hook 41 may include only one arm 415. Positions of the latching slot 51 and the unlatching slot 53 may be exchanged. In that case, the button 45 should be pulled to open the top cover 10. In that case, the elastic member 43 becomes extended when the hook 41 moves in the receiving space 57 from a first position below the latching slot 51 to a second position below the unlatching slot 53. The hooking portion 40 may be disposed on the main body 20 and the latching portion 50 may be formed on the top cover 10.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A foldable electronic device, comprising:
   a first cover;
   a second cover rotatably coupled to the first cover; and
   a latch mechanism comprising a hooking portion disposed on the first cover and a latching portion formed on the second cover;
   wherein the hooking portion has a hook, the hook comprises a base, a bracket and two arms, the bracket is formed from an edge of the base, the arms are formed at an end of the bracket and are deformable towards the bracket, the bracket has a connecting portion at an end, the two arms extend from opposite ends of the connection portion, the arms have two free ends and are capable of being bent towards the base, each of the free ends of the arms forms one protrusion facing the bracket, the latching portion has a latching slot, an unlatching slot, and a sliding slot connecting the latching slot and the unlatching slot, the hook is deformable to be capable of latching the latching slot or unlatching from the latching portion when sliding to the unlatching slot along the sliding slot.

2. The foldable electronic device as claimed in claim 1, wherein a length of the latching slot is longer than a length of the connecting portion and longer than the distance between two outer surfaces of the free ends when the arms are squeezed to touch the bracket via the protrusions, while shorter than the distance between two outer surfaces of the free ends at its largest measure of the arms when the arms are not compressed, a length of the unlatching slot is longer than the distance between the two outer surfaces at their largest measure.

3. The foldable electronic device as claimed in claim 1, wherein the hooking portion of the latch mechanism further comprises an elastic member disposed between the base of the hook and the first cover.

4. The foldable electronic device as claimed in claim 3, wherein the hooking portion of the latch mechanism further comprises a button, the button is fixed to the base of the hook and opposite to the elastic member.

5. The foldable electronic device as claimed in claim 3, wherein the elastic member is a leaf spring.

6. The foldable electronic device as claimed in claim 1, wherein the latching portion further comprises a receiving space, the receiving space is below and communicated with the latching slot, the unlatching slot, and the sliding slot.

7. A latch mechanism for a foldable electronic device, comprising:
   a hooking portion; and
   a latching portion for engaging with the hooking portion;
   wherein the hooking portion has a hook, the hook comprises a base, a bracket and two arms, the bracket is formed from an edge of the base, the arms are formed at an end of the bracket and are deformable towards the bracket, the bracket has a connecting portion at an end, the two arms extend from opposite ends of the connection portion, the arms have two free ends and are capable of being bent towards the base, each of the free ends of the arms forms one protrusion facing the bracket, the latching portion has a latching slot, an unlatching slot, and a sliding slot connecting the latching slot and the unlatching slot, the hook is deformable to be capable of latching the latching slot or unlatching from the latching portion when sliding to the unlatching slot along the sliding slot.

8. The latch mechanism as claimed in claim 7, wherein a length of the latching slot is longer than a length of the connecting portion and longer than the distance between two outer surfaces of the free ends when the arms are squeezed to touch the bracket via the protrusions, while shorter than the distance between two outer surfaces of the free ends at its largest measure of the arms when the arms are not compressed, a length of the unlatching slot is longer than the distance between the two outer surfaces at their largest measure.

9. The latch mechanism as claimed in claim 7, wherein the hooking portion of the latch mechanism further comprises an elastic member disposed between the base of the hook and the first cover.

10. The latch mechanism as claimed in claim 9, wherein the hooking portion of the latch mechanism further comprises a button, the button is fixed to the base of the hook and opposite to the elastic member.

11. The latch mechanism as claimed in claim 9, wherein the elastic member is a leaf spring.

12. The latch mechanism as claimed in claim 7, wherein the latching portion further comprises a receiving space, the receiving space is below, and communicated with, the latching slot, the unlatching slot, and the sliding slot.

* * * * *